US012092284B2

(12) United States Patent
Chang

(10) Patent No.: US 12,092,284 B2
(45) Date of Patent: Sep. 17, 2024

(54) VEHICLE LAMP HAVING SWITCHING STRUCTURE FOR LOW-BEAM AND HIGH-BEAM HEADLIGHTS

(71) Applicant: SONAR AUTO PARTS CO., LTD., New Taipei (TW)

(72) Inventor: Chung-Yi Chang, Hsinchu County (TW)

(73) Assignee: SONAR AUTO PARTS CO., LTD., New Taipei (TW)

( * ) Notice: Subject to any disclaimer, the term of this patent is extended or adjusted under 35 U.S.C. 154(b) by 0 days.

(21) Appl. No.: 18/372,074

(22) Filed: Sep. 23, 2023

(65) Prior Publication Data

US 2024/0218997 A1 Jul. 4, 2024

Related U.S. Application Data

(63) Continuation-in-part of application No. 18/148,398, filed on Dec. 29, 2022, now abandoned.

(51) Int. Cl.

| | |
|---|---|
| ***F21S 41/683*** | (2018.01) |
| ***F21S 41/147*** | (2018.01) |
| ***F21S 41/27*** | (2018.01) |
| ***F21S 41/32*** | (2018.01) |
| ***F21S 41/43*** | (2018.01) |
| ***F21S 45/40*** | (2018.01) |

(52) U.S. Cl.

CPC ........... *F21S 41/683* (2018.01); *F21S 41/147* (2018.01); *F21S 41/27* (2018.01); *F21S 41/32* (2018.01); *F21S 41/43* (2018.01); *F21S 45/40* (2018.01)

(58) Field of Classification Search

CPC .............. F21S 41/68–698; F21S 45/40; F21W 2102/13–165

See application file for complete search history.

(56) References Cited

U.S. PATENT DOCUMENTS

| | | | | |
|---|---|---|---|---|
| 10,502,387 | B2 * | 12/2019 | Wang .................... | F21S 41/663 |
| 11,092,308 | B2 * | 8/2021 | Matsumoto ........... | F21S 41/365 |
| 2015/0362146 | A1 * | 12/2015 | Mochizuki ........... | B60Q 1/1438 362/513 |

FOREIGN PATENT DOCUMENTS

| | | | |
|---|---|---|---|
| JP | 2017204447 A | * | 11/2017 |

* cited by examiner

*Primary Examiner* — Mariceli Santiago
(74) *Attorney, Agent, or Firm* — Li & Cai Intellectual Property (USA) Office

(57) ABSTRACT

A vehicle lamp having a switching structure for low-beam and high-beam headlights is provided. The vehicle lamp includes a heat dissipating device, an LED light source, an electromagnet, a reflector, a lens unit, a light-shaping plate, and a driving rod. The LED light source and the electromagnet are disposed on the heat dissipating device, and the reflector is a one-piece structure disposed above the LED light source. The driving rod is disposed between the electromagnet and the light-shaping plate, and the electromagnet drives the driving rod to synchronously drive the light-shaping plate to be moved to a first position or a second position. A top surface of the heat dissipating device is oblique relative to a central axis of the lens unit, and the LED light source is disposed on the top surface of the heat dissipating device.

11 Claims, 7 Drawing Sheets

VEHICLE LAMP HAVING SWITCHING STRUCTURE FOR LOW-BEAM AND HIGH-BEAM HEADLIGHTS

CROSS-REFERENCE TO RELATED PATENT APPLICATION

This application is a Continuation-In-Part of the U.S. application Ser. No. 18/148,398, filed on Dec. 29, 2022, now is, and entitled "VEHICLE LAMP HAVING SWITCHING STRUCTURE FOR LOW-BEAM AND HIGH-BEAM HEADLIGHTS". The entire content of each of the above-identified applications is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a vehicle lamp, and more particularly to a vehicle lamp having a switching structure for low-beam and high-beam headlights.

BACKGROUND OF THE DISCLOSURE

Vehicles such as automobiles or motorcycles generally have low-beam and high-beam headlights disposed thereon as vehicle lamps. The low-beam and high-beam headlights can be switched between low-beam and high-beam modes by using a switching device. The switching device includes a light-shaping plate that is disposed in front of a light source, and the light-shaping plate can be driven by an electromagnet to change a reflected light of the light source to achieve switching between the low-beam and high-beam modes. However, the light source of the existing switching device needs to be disposed on a heat dissipating device. The heat dissipating device has a certain longitudinal length, causing the vehicle lamp to have a longer overall length, and to occupy larger space in vehicles for installation.

SUMMARY OF THE DISCLOSURE

In response to the above-referenced technical inadequacies, the present disclosure provides a vehicle lamp having a switching structure for low-beam and high-beam headlights. In the vehicle lamp of the present disclosure, a longitudinal length of a heat dissipating structure can be shortened, such that an overall length of the vehicle lamp is decreased.

In one aspect, the present disclosure provides a vehicle lamp having a switching structure for low-beam and high-beam headlights. The vehicle lamp includes a heat dissipating device, an LED light source, an electromagnet, a reflector, a lens unit, a light-shaping plate, and a driving rod. The heat dissipating device has a top surface. The LED light source is disposed on the top surface of the heat dissipating device. The electromagnet is disposed on the heat dissipating device. The reflector is located above the LED light source and has a reflection surface. The lens unit is located in front of the reflector. Light emitted from the LED light source is able to be reflected by the reflection surface of the reflector and be irradiated outward through the lens unit. The top surface of the heat dissipating device is oblique relative to a central axis of the lens unit, and a height of the top surface of the heat dissipating device is decreased along a direction away from a rear side of the lens unit. The light-shaping plate is rotatably disposed between the reflector and the lens unit, and is able to be moved between a first position and a second position. The driving rod is disposed between the electromagnet and the light-shaping plate. The electromagnet is capable of driving the driving rod to synchronously drive the light-shaping plate to be moved to the first position or the second position so as to change a reflected light of the LED light source, and the reflected light forms a low-beam or a high-beam.

In certain embodiments, the driving rod has a pivot portion, an active end, and a passive end, the active end and the passive end are respectively connected to two ends of the pivot portion, the pivot portion is pivotally connected to a pivot shaft of the heat dissipating device, and the active end and the passive end are respectively connected to the electromagnet and the light-shaping plate.

In certain embodiments, the active end is capable of moving along a left-right direction and the passive end is capable of moving along a front-rear direction, so as to change directions of power transmission of the electromagnet and the light-shaping plate.

In certain embodiments, the electromagnet is disposed at a front end of the heat dissipating device, and the electromagnet is horizontally disposed at the front end of the heat dissipating device.

In certain embodiments, a bottom end of the reflection surface of the reflector is extended downward to form an extension portion, and a horizontal height of a lower end of the extension portion is equal to or substantially same as a horizontal height of a lower end of the LED light source.

In conclusion, in the vehicle lamp having a switching structure for low-beam and high-beam headlights provided by the present disclosure, the vehicle lamp includes a heat dissipating device, an LED light source, an electromagnet, a reflector, a lens unit, a light-shaping plate, and a driving rod. Light emitted from the LED light source is able to be reflected by the reflection surface of the reflector and be irradiated outward through the lens unit. The light-shaping plate is rotatably disposed between the reflector and the lens unit, and is able to be moved between a first position and a second position. The driving rod is disposed between the electromagnet and the light-shaping plate. The electromagnet is capable of driving the driving rod to synchronously drive the light-shaping plate to be moved to the first position or the second position so as to change a reflected light of the LED light source, and the reflected light forms a low-beam or a high-beam. The top surface of the heat dissipating device is oblique relative to a central axis of the lens unit, and a height of the top surface of the heat dissipating device is decreased along a direction away from a rear side of the lens unit. Therefore, a longitudinal length of a heat dissipating structure can be shortened, such that an overall length of the vehicle lamp is decreased.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
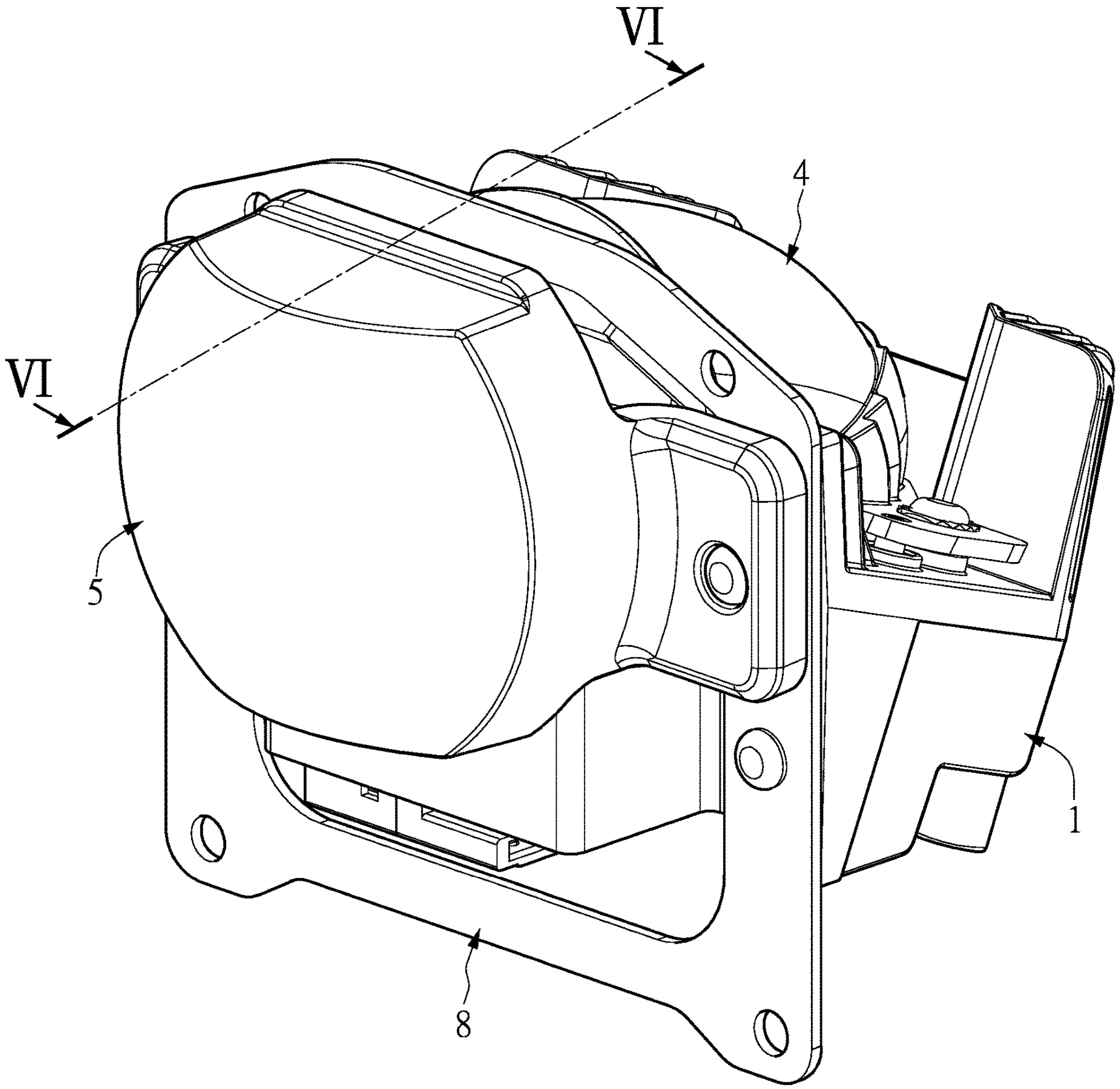
FIG. 1 is a schematic perspective view of a vehicle lamp having a switching structure for low-beam and high-beam headlights of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Embodiment

Figure 2:
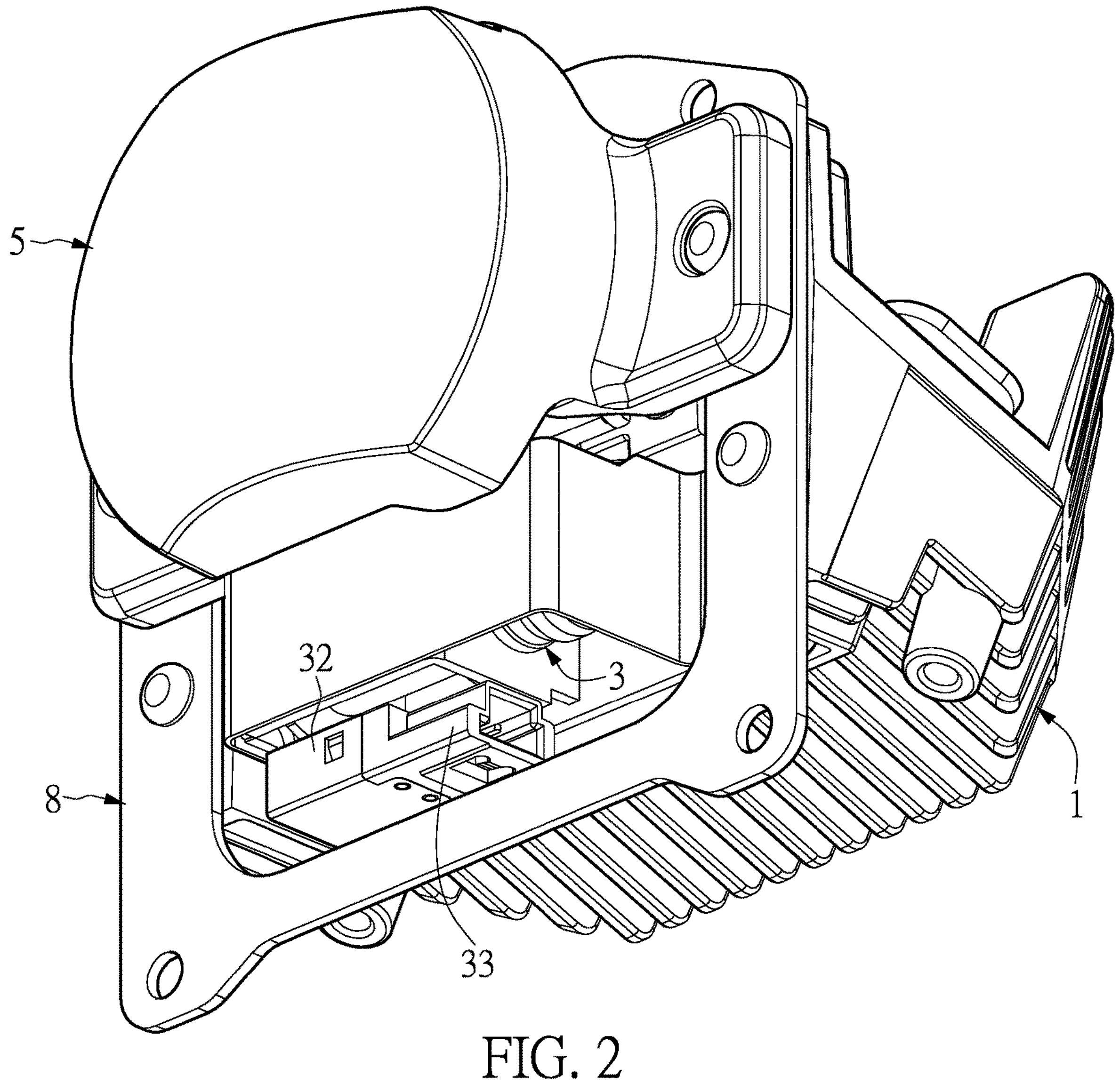
FIG. 2 is another schematic perspective view of the vehicle lamp of the present disclosure.
Figure 3:
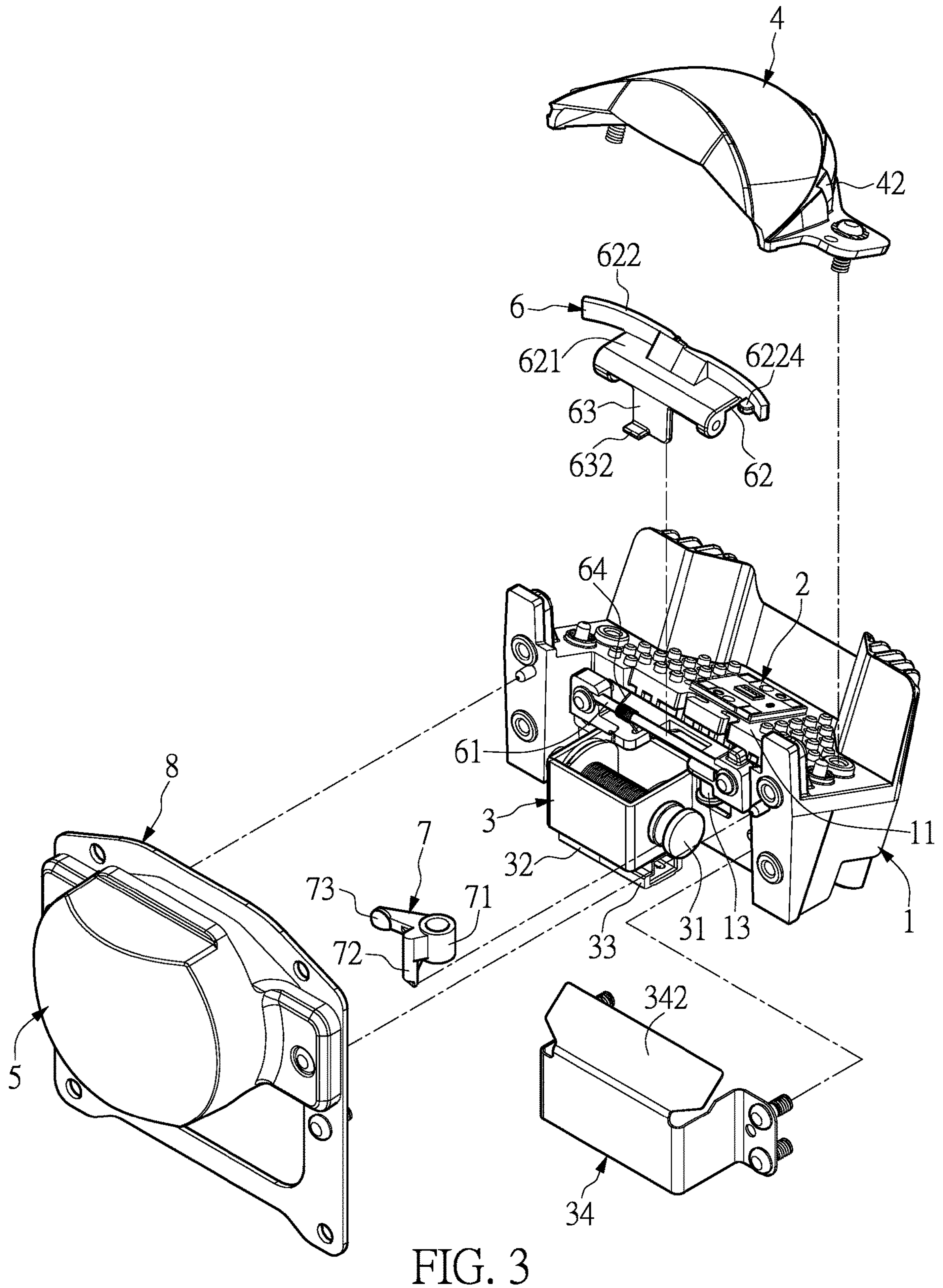
FIG. 3 is a schematic exploded perspective view of the vehicle lamp of the present disclosure.

Referring to FIG. 1 to FIG. 3, one embodiment of the present disclosure provides a vehicle lamp having a switching structure for low-beam and high-beam headlights. The vehicle lamp is suitable for being mounted on an automobile or motorcycle to switch between low-beam and high-beam. The vehicle lamp includes a heat dissipating device 1, an LED light source 2, an electromagnet 3, a reflector 4, a lens unit 5, a light-shaping plate 6, and a driving rod 7.

Figure 4:
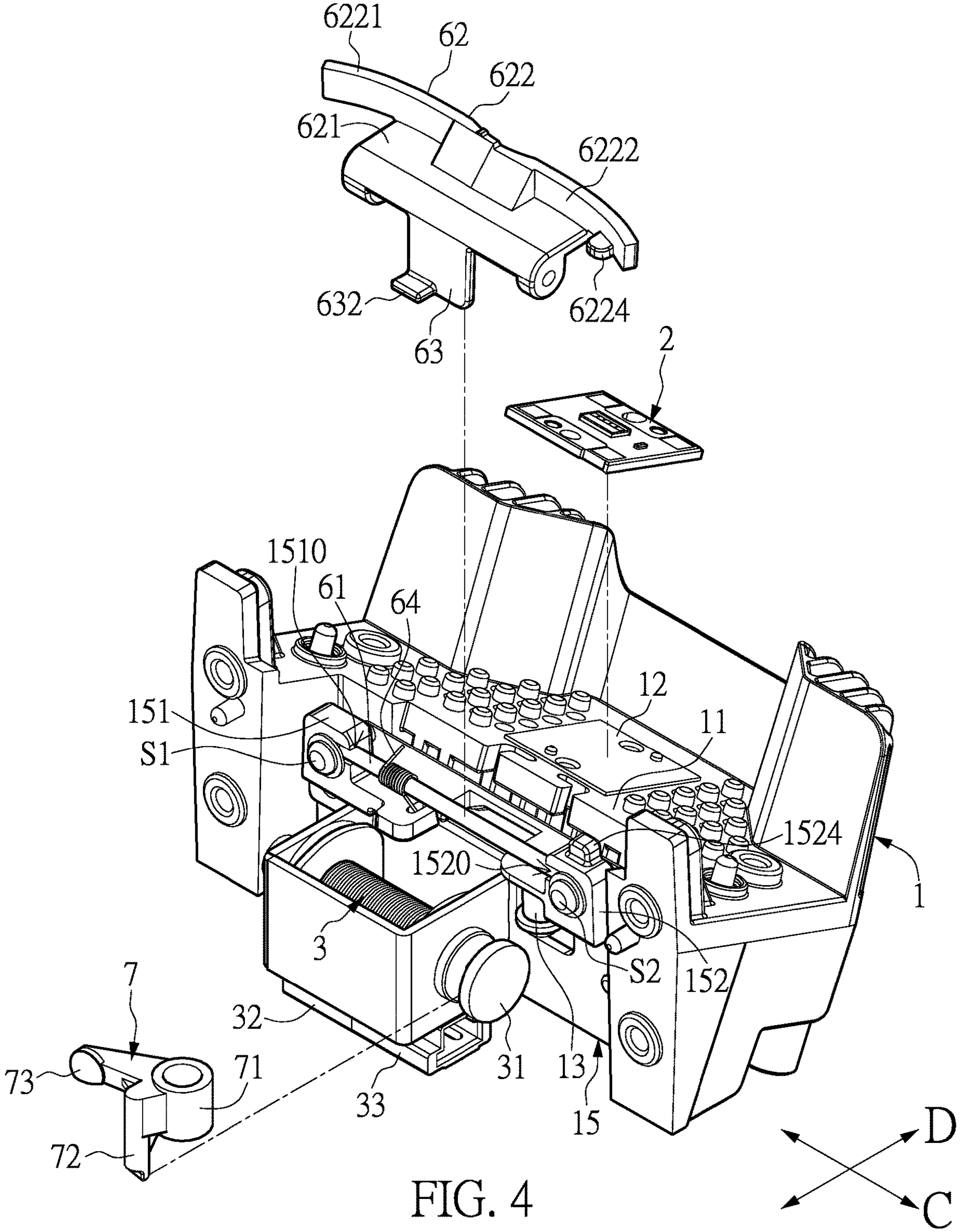
FIG. 4 is a schematic perspective view of an internal structure of the vehicle lamp of the present disclosure.
Figure 6:
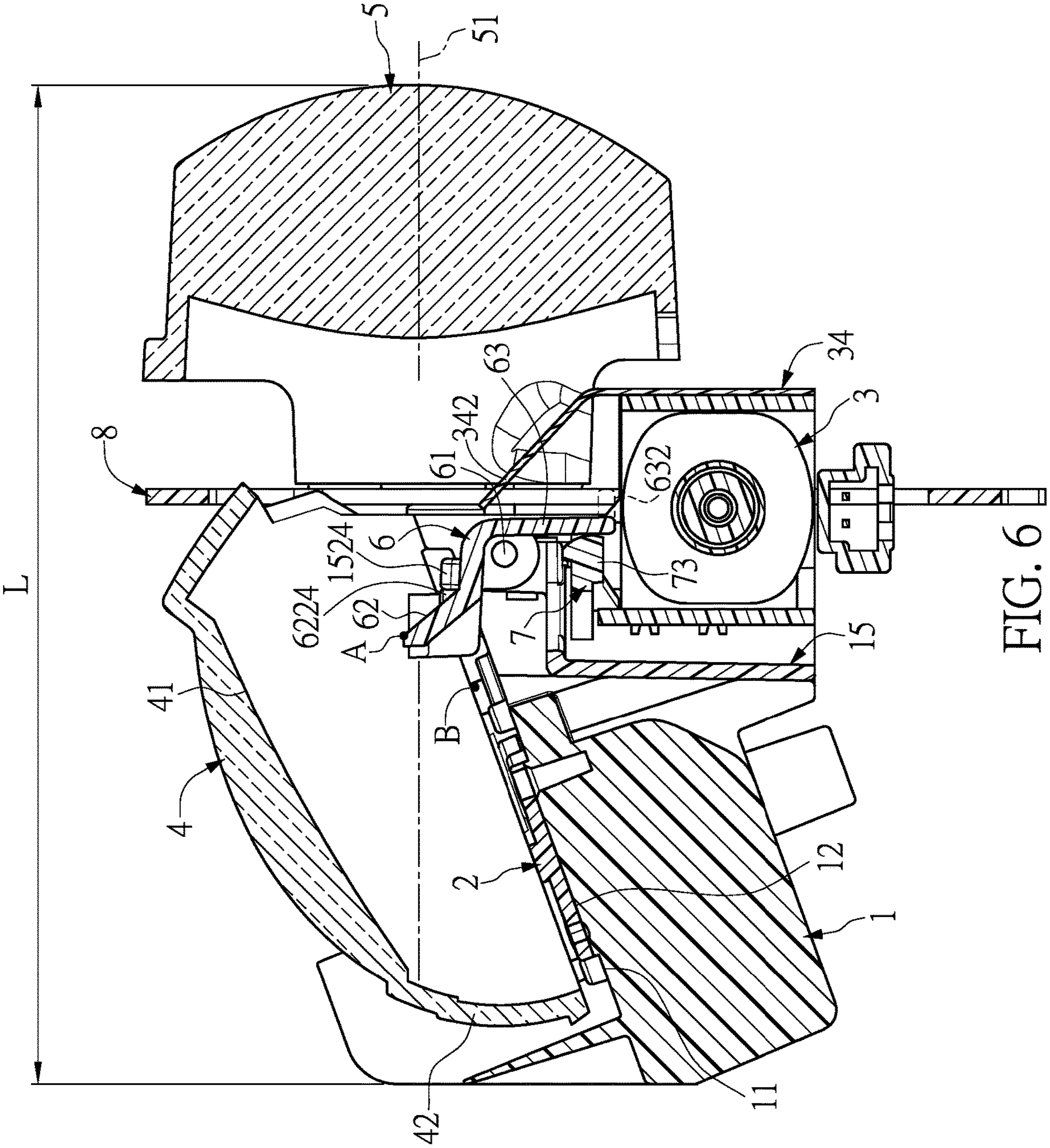
FIG. 6 is a cross-sectional view taken along line VI-VI of FIG. 1.
Figure 7:
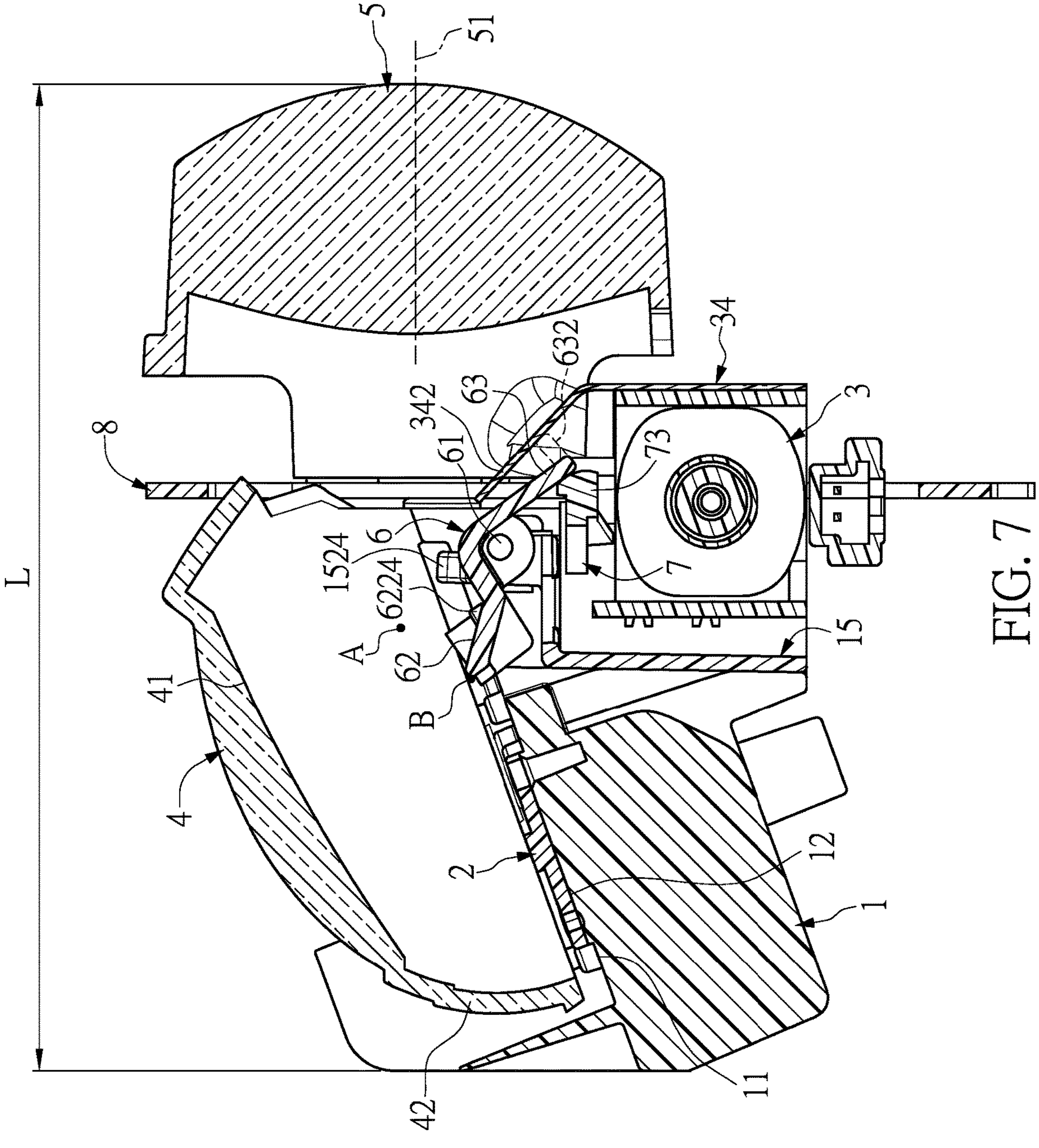
FIG. 7 is a cross-sectional view of the vehicle lamp of FIG. 6 in another configuration.

The heat dissipating device 1 is manufactured from a metal material (e.g., copper or aluminum) having good thermal conductivity, and a structure of the heat dissipating device 1 is not limited in the present disclosure. The heat dissipating device 1 has a top surface 11 that is slanted; in other words, the top surface 11 is slanted relative to a horizontal line. The LED light source 2 is disposed on the top surface 11 of the heat dissipating device 1. In this embodiment, a carrying surface 12 is defined on the top surface 11 (as shown in FIG. 4, FIG. 6, and FIG. 7), the carrying surface 12 is parallel to the top surface 11, and the LED light source 2 is disposed on the carrying surface 12, and the LED light source 2 can emit light upwardly. A heat generated from the LED light source 2 can be transmitted to the heat dissipating device 1, so that the heat dissipating device 1 can be used to aid in heat dissipation.

The electromagnet 3 is disposed on the heat dissipating device 1. The electromagnet 3 can be disposed at a front end of the heat dissipating device 1, and the electromagnet 3 can include an action rod 31 for outputting power. A Zener diode 32 and a connector 33 can be disposed at a bottom portion of the electromagnet 3. The Zener diode 32 is electrically connected between the electromagnet 3 and the connector 33 and provides voltage stabilization. The connector 33 can be used to input an electrical power, and the electrical power is transmitted to the electromagnet 3 through the Zener diode 32, so that an operation of the electromagnet 3 can be controlled.

The electromagnet 3 further has a protective shell 34 that is fixed before the electromagnet 3. The protective shell 34 has a top slanted board 342 between the electromagnet 3 and the lens unit 5. Specifically, the top slanted board 342 is extended obliquely toward the light-shaping plate 6.

The reflector 4 is located above the LED light source 2 and has a reflection surface 41 (as shown in FIG. 6 and FIG. 7), and the reflection surface 41 is located at an inner side of the reflector 4. The lens unit 5 is located in front of the reflector 4, and the reflector 4 and the lens unit 5 can be disposed on the heat dissipating device 1. A height of the top surface 11 of the heat dissipating device 1 is decreased along a rear direction; that is, the height of the top surface 11 is decreased along a direction away from a rear side of the lens unit 5. Moreover, the top surface 11 of the heat dissipating device 1 is oblique relative to a central axis 51 of the lens unit 5, so that a longitudinal length L of the heat dissipating device 1 can be shortened (as shown in FIG. 6 and FIG. 7).

Figure 5:
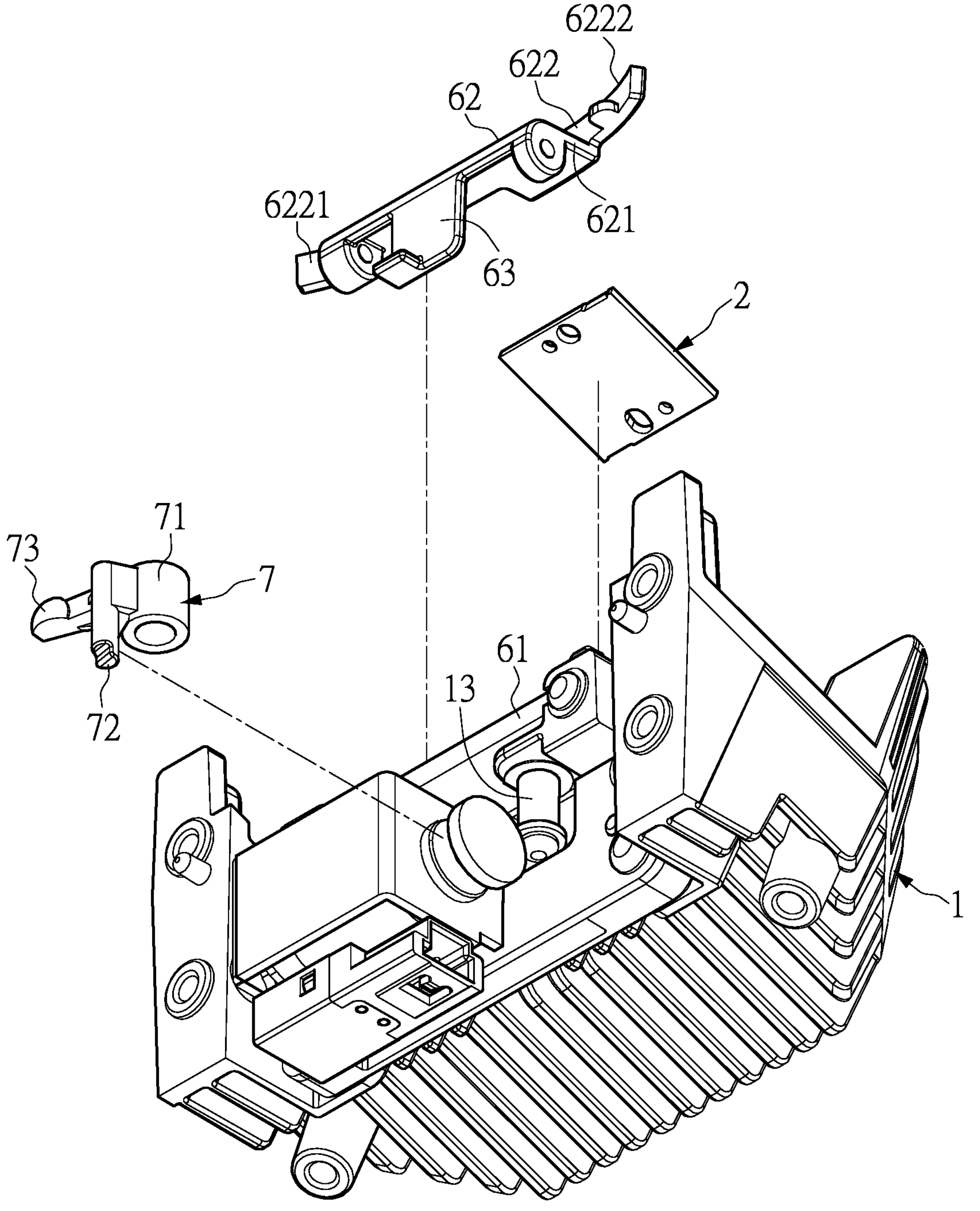
FIG. 5 is another schematic perspective view of an internal structure of the vehicle lamp of the present disclosure.

In this embodiment, an adaptor plate 8 is disposed between the lens unit 5 and the heat dissipating device, so that the adaptor plate 8 can be used for being mounted on suitable locations. Light emitted from the LED light source 2 can be reflected by the reflection surface 41 of the reflector and irradiated outward through the lens unit 5. The reflector 4 is a one-piece structure, and a bottom end of the reflection surface 41 of the reflector 4 is extended downward to form an extension portion 42, and a horizontal height of a lower end of the extension portion 42 is equal to or substantially the same as a horizontal height of a lower end of the LED light source 2. Therefore, the reflector 4 uses the extension portion 42 to extend downward, thereby providing a better reflection. The light-shaping plate 6 is rotatably disposed between the reflector 4 and the lens unit 5, and the light-shaping plate 6 is pivotally connected to the heat dissipating device 1 by a rotation shaft 61, and the light-shaping plate 6 can be located above the electromagnet 3. The light-shaping plate 6 can be moved between a first position A and a second position B (as shown in FIG. 6 and FIG. 7). The light-shaping plate 6 has a shielding portion 62 and a linkage portion 63, and the linkage portion 63 is connected to the shielding portion 62. An elastic element 64 (as shown in FIG. 4 and FIG. 5) can be sleeved on the rotation shaft 61, and two ends of the elastic element 64 respectively abut against the heat dissipation device 1 and the light-shaping plate 6, so as to provide an elastic force for allowing the light-shaping plate 6 to elastically recover, so that the light-shaping plate 6 is moved to the first position A. Preferably, the shielding portion 62 includes a bottom plate 621 and a rear plate 622, and the rear plate 622 is erected at an edge of the bottom plate 621. Furthermore, the rear plate 622 can include two arc-shaped plate bodies 6221 and 6222 (as shown in FIG. 4 and FIG. 5). The two arc-shaped plate bodies 6221 and 6222 extend from a middle of the bottom plate toward two sides of the bottom plate, and the two arc-shaped plate bodies 6221 and 6222 protrude from the two sides of the bottom plate 621, so that a better light shape can be presented.

Referring to FIG. 4, the light-shaping plate 6 further has an upper stopper 6224 and a lower stopper 632. The upper stopper 6224 is protruded toward the lens unit 5 from one side of the rear plate 622 and adjacent to an edge of the bottom plate 621. The lower stopper 632 is protruded toward the lens unit 5 from the bottom end of the linkage portion 63. The upper stopper 6224 can stop the light-shaping plate 6 at a low-beam status (as shown in FIG. 6), that is the first position A. The lower stopper 632 can stop the light-shaping plate 6 at a high-beam status (as shown in FIG. 7), that is the first position B.

The driving rod 7 is disposed between the electromagnet 3 and the light-shaping plate 6. The electromagnet 3 can drive the driving rod 7 to synchronously drive the light-shaping plate 6 to be moved to the first position A (as shown in FIG. 6) or the second position B (as shown in FIG. 7) so as to change a reflected light of the LED light source 2, and the reflected light forms a low-beam or a high-beam. Specifically, the electromagnet 3 can drive the driving rod 7 to synchronously drive the light-shaping plate 6 to be raised to the first position A; at this time, the shielding portion 62 of the light-shaping plate 6 is raised and shields the light, so as to form a low-beam. Furthermore, the electromagnet 3 can drive the driving rod 7 to synchronously drive the light-shaping plate 6 to be lowered to the second position B; at this time, the shielding portion 62 of the light-shaping plate 6 is lowered and does not shield the light, so as to form a high-beam.

Preferably, the driving rod 7 has a pivot portion 71, an active end 72, and a passive end 73, the active end 72 and the passive end 73 are respectively connected to two ends of the pivot portion 71, and the pivot portion 71 is pivotally connected to a pivot shaft 13 of the heat dissipating device 1, so that the driving rod 7 can be rotatably disposed on the heat dissipating device 1. The active end 72 and the passive end 73 are respectively connected to the electromagnet 3 and the light-shaping plate 6. That is, the active end 72 can be connected to the action rod 31 of the electromagnet 3, and the passive end 73 can be connected to the linkage portion 63 of the light-shaping plate 6. In this embodiment, the active end 72 abuts against the action rod 31 of the electromagnet 3, and the passive end 73 abuts against the linkage portion 63 of the light-shaping plate 6, such that assembly is simple and easy, and a preferred power transmission structure can be formed.

In addition, the heat dissipating device 1 has a mounting board 15 which is disposed at a front end of the heat dissipating device 1. The mounting board 15 is disposed between the LED light source 2 and the electromagnet 3. The mounting board 15 has a first pivotal portion 151 and a second pivotal portion 152. Two ends of the rotation shaft 61 are pivotally connected to the first pivotal portion 151 and the second pivotal portion 152, respectively. In detail, the first pivotal portion 151 forms a first pivotal slot 1510, and the second pivotal portion 152 forms a second pivotal slot 1520. Two ends of the rotation shaft 61 are disposed in the first pivotal slot 1510 and the second pivotal slot 1520, respectively. Further, a first fixing element S1 is fixed to the first pivotal portion 151 to hold one end of the rotation shaft 61 in the first pivotal slot 1510, and a second fixing element S2 is fixed the second pivotal portion 152 to hold the other end of the rotation shaft 61 in the second pivotal slot 1520.

Referring to FIG. 4, the mounting board 15 further has a retaining block 1524, that is protruded upward from the second pivotal portion 152. The retaining block 1524 is used to block the upper stopper 6224, so that the light-shaping plate 6 can be stopped at the low-beam status (as shown in FIG. 6), that is the first position A.

Referring to FIG. 7, the top slanted board 342 of the protective shell 34 can block the lower stopper 632, so that the light-shaping plate 6 can be stopped at the high-beam status (as shown in FIG. 7), that is the second position B.

When the electromagnet 3 is activated, the action rod 31 can drive the light-shaping plate 6 through the driving rod 7 so that the light-shaping plate 6 is located at the first position A or the second position B. Preferably, the active end 72 can move along a left-right direction C (as shown in FIG. 4), and the passive end 73 can move along a front-rear direction D. That is, the active end 72 can be pushed by the action rod 31 of the electromagnet 3 to move along the left-right direction C, and the passive end 73 can move along the front-rear direction D so as to push the linkage portion 63 of the light-shaping plate 6. Accordingly, the action rod 31 of the electromagnet 3 can drive the light-shaping plate 6 through the driving rod 7, thereby changing directions of power transmission of the electromagnet 3 and the light-shaping plate 6. Moreover, the arrangement of the electromagnet 3 and the light-shaping plate 6 can be more flexible, and the electromagnet 3 can be horizontally disposed at a front end of the heat dissipating device 1 to save an occupied space and decrease an overall height.

When the light-shaping plate 6 is located at the first position A, light emitted by the LED light source 2 is shielded after the light is reflected by the reflection surface 41 of the reflector 4 (as shown in FIG. 6), so that a light shape of the low-beam is produced. On the other hand, when the light-shaping plate 6 is located at the second position B (as shown in FIG. 7), light emitted by the LED light source 2 is not shielded after the light is reflected by the reflection surface 41 of the reflector 4, so that a light shape of the high-beam is produced.

Beneficial Effects of the Embodiment

In conclusion, in the vehicle lamp having a switching structure for low-beam and high-beam headlights provided by the present disclosure, the vehicle lamp includes a heat dissipating device, an LED light source, an electromagnet, a reflector, a lens unit, a light-shaping plate, and a driving rod. Light emitted from the LED light source is able to be reflected by the reflection surface of the reflector and be irradiated outward through the lens unit. The light-shaping plate is rotatably disposed between the reflector and the lens unit, and is able to be moved between a first position and a second position. The driving rod is disposed between the electromagnet and the light-shaping plate. The electromagnet is capable of driving the driving rod to synchronously drive the light-shaping plate to be moved to the first position or the second position so as to change a reflected light of the LED light source, and the reflected light forms a low-beam or a high-beam. The top surface of the heat dissipating device is oblique relative to a central axis of the lens unit, and a height of the top surface of the heat dissipating device is decreased along a direction away from a rear side of the lens unit. Therefore, a longitudinal length of a heat dissipating structure can be shortened, such that an overall length of the vehicle lamp is decreased.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A vehicle lamp having a switching structure for low-beam and high-beam headlights, comprising:

- a heat dissipating device having a top surface;
- an LED light source disposed on the top surface of the heat dissipating device;
- an electromagnet disposed on the heat dissipating device;
- a mounting board disposed between the LED light source and the electromagnet, the mounting board having a retaining block;
- a protective shell fixed before the electromagnet, the protective shell having a top slanted board between the electromagnet and the lens unit;
- a reflector located above the LED light source and having a reflection surface;
- a lens unit located in front of the reflector, wherein light emitted from the LED light source is able to be reflected by the reflection surface of the reflector and be irradiated outward through the lens unit; wherein the top surface of the heat dissipating device is oblique relative to a central axis of the lens unit, and a height of the top surface of the heat dissipating device is decreased along a direction away from a rear side of the lens unit;
- a light-shaping plate having an upper stopper and a lower stopper, the light-shaping plate being rotatably disposed between the reflector and the lens unit, and being able to be moved between a first position and a second position; and
- a driving rod disposed between the electromagnet and the light-shaping plate; wherein the electromagnet is capable of driving the driving rod to synchronously drive the light-shaping plate to be moved to the first position or the second position so as to change a reflected light of the LED light source, so that the reflected light forms a low-beam or a high-beam;
- wherein the retaining block is configured to block the upper stopper, so that the light-shaping plate is able to be stopped at the first position;
- wherein the top slanted board of the protective shell is configured to block the lower stopper, so that the light-shaping plate is able to be stopped at the second position.

2. The vehicle lamp according to claim 1, wherein the driving rod has a pivot portion, an active end, and a passive end, the active end and the passive end are respectively connected to two ends of the pivot portion, the pivot portion is pivotally connected to a pivot shaft of the heat dissipating device, and the active end and the passive end are respectively connected to the electromagnet and the light-shaping plate.

3. The vehicle lamp according to claim 2, wherein the active end is capable of moving along a left-right direction and the passive end is capable of moving along a front-rear direction, so as to change directions of power transmission of the electromagnet and the light-shaping plate.

4. The vehicle lamp according to claim 2, wherein the electromagnet includes an action rod, and the light-shaping plate has a shielding portion and a linkage portion; wherein the linkage portion is connected to the shielding portion, the active end is connected to the action rod of the electromagnet, and the passive end is connected to the linkage portion of the light-shaping plate, so that when the electromagnet is activated, the action rod is capable of driving the light-shaping plate through the driving rod.

5. The vehicle lamp according to claim 4, wherein the active end abuts against the action rod of the electromagnet, and the passive end abuts against the linkage portion of the light-shaping plate.

6. The vehicle lamp according to claim 1, wherein the light-shaping plate has a shielding portion and a linkage portion, the linkage portion is connected to the shielding portion, and the driving rod is connected to the linkage portion of the light-shaping plate; wherein the shielding portion includes a bottom plate and a rear plate, the rear plate is erected at an edge of the bottom plate and includes two arc-shaped plate bodies; wherein the two arc-shaped plate bodies extend from a middle of the bottom plate toward two sides of the bottom plate, and the two arc-shaped plate bodies protrude from the two sides of the bottom plate; wherein the upper stopper is protruded toward the lens unit from one side of the rear plate and adjacent to an edge of the bottom plate; wherein the lower stopper is protruded toward the lens unit from the bottom end of the linkage portion.

7. The vehicle lamp according to claim 1, wherein the electromagnet is disposed at a front end of the heat dissipating device, and the electromagnet is horizontally disposed at the front end of the heat dissipating device.

8. The vehicle lamp according to claim 1, wherein the light-shaping plate is pivotally connected to the heat dissipating device by a rotation shaft, and the light-shaping plate is located above the electromagnet; wherein an elastic element is disposed between the heat dissipation device and the light-shaping plate to provide an elastic force for allowing the light-shaping plate to elastically recover, so that the light-shaping plate is moved to the first position; wherein the mounting board has a first pivotal portion and a second pivotal portion, and two ends of the rotation shaft are pivotally connected to the first pivotal portion and the second pivotal portion, respectively.

9. The vehicle lamp according to claim 8, wherein the first pivotal portion forms a first pivotal slot, and the second pivotal portion forms a second pivotal slot, the two ends of the rotation shaft are respectively disposed in the first pivotal slot and the second pivotal slot, wherein a first fixing element is fixed to the first pivotal portion to hold one end of the rotation shaft in the first pivotal slot, and a second fixing element is fixed the second pivotal portion to hold another end of the rotation shaft in the second pivotal slot.

10. The vehicle lamp according to claim 1, wherein a carrying surface is defined on the top surface, the carrying surface is parallel to the top surface, and the LED light source is disposed on the carrying surface.

11. The vehicle lamp according to claim 1, wherein a bottom end of the reflection surface of the reflector is extended downward to form an extension portion, and a horizontal height of a lower end of the extension portion is equal to or substantially the same as a horizontal height of a lower end of the LED light source.

* * * * *